US008734551B2

(12) United States Patent
Arnaud

(10) Patent No.: US 8,734,551 B2
(45) Date of Patent: May 27, 2014

(54) FORMALDEHYDE-FREE ABRASIVE ARTICLE

(75) Inventor: Alix Arnaud, Montrouge (FR)

(73) Assignees: Saint-Gobain Abrasives, Inc., Worcester, MA (US); Saint-Gobain Abrasifs Technologie et Services, S.A.S., Conflans Sainte Honorine (FR)

( * ) Notice: Subject to any disclaimer, the term of this patent is extended or adjusted under 35 U.S.C. 154(b) by 647 days.

(21) Appl. No.: 12/991,365

(22) PCT Filed: May 6, 2009

(86) PCT No.: PCT/FR2009/050841
§ 371 (c)(1),
(2), (4) Date: Jan. 31, 2011

(87) PCT Pub. No.: WO2009/141568
PCT Pub. Date: Nov. 26, 2009

(65) Prior Publication Data
US 2011/0113700 A1 May 19, 2011

(30) Foreign Application Priority Data

May 6, 2008 (FR) ...................................... 08 52992

(51) Int. Cl.
*B24D 11/00* (2006.01)
(52) U.S. Cl.
USPC .......................................................... 51/300
(58) Field of Classification Search
USPC .......................................... 51/298, 295, 300
See application file for complete search history.

(56) References Cited

U.S. PATENT DOCUMENTS

| 4,903,440 | A | * | 2/1990 | Kirk et al. ........................ 51/298 |
| 5,236,472 | A | * | 8/1993 | Kirk et al. ........................ 51/298 |
| 5,486,219 | A | * | 1/1996 | Ford et al. ........................ 51/298 |
| 5,611,825 | A | * | 3/1997 | Engen et al. ..................... 51/295 |
| 5,611,827 | A | | 3/1997 | Hammarstrom et al. |
| 5,976,204 | A | | 11/1999 | Hammarstrom et al. |
| 6,768,029 | B1 | | 7/2004 | Khan et al. |
| 2005/0070646 | A1 | * | 3/2005 | Chen ............................. 524/147 |

FOREIGN PATENT DOCUMENTS

| EP | 1 198 443 | 4/2002 |
| WO | 00 78699 | 12/2000 |
| WO | 2009 053581 | 4/2009 |

OTHER PUBLICATIONS

Pryde, E.H., et al., "Ozonization of Soybean Oil. The Preparation and Some Properties of Aldehyde Oils," Journal of the American Oil Chemists' Society, vol. 38, pp. 375-379, (Jul. 1961) XP000867112.
International Search Report issued Feb. 23, 2010 in PCT/FR09/050841 filed May 6, 2009.
International Preliminary Report of Patentability issued Dec. 18, 2010 in PCT/FR09/050841 filed May 6, 2009.

* cited by examiner

*Primary Examiner* — Pegah Parvini
(74) *Attorney, Agent, or Firm* — Oblon, Spivak, McClelland, Maier & Neustadt, L.L.P.

(57) ABSTRACT

An abrasive article which is made from a liquid resin composition containing no formaldehyde, which replaces the resol or urea-formaldehyde resin used as an adhesive in coated abrasives and the resol used as an impregnation resin in bonded abrasives. The liquid resin composition comprises a product that results from the oxidative cleavage of an unsaturated plant or animal oil, chosen from aldehydes, peroxides and mixtures of these compounds. The liquid resin composition can be used for the manufacture of coated and bonded abrasive articles.

24 Claims, No Drawings

FORMALDEHYDE-FREE ABRASIVE ARTICLE

CROSS REFERENCE TO RELATED APPLICATIONS

The present application is the national stage of international application PCT/FR2009/050841, filed on May 6, 2009, published under WO 2009/141568 on Nov. 26, 2009, the text of which is incorporated by reference, and claims the benefit of the filing date of French Application No. 0852992, filed on May 6, 2008, the text of which is also incorporated by reference.

The present invention relates to an abrasive article which is made from a liquid resin composition containing no formaldehyde.

Abrasive articles generally incorporate a multitude of abrasive grains firmly bound to a support or together by a binder. These articles are widely used for machining various materials, especially in cutting, grinding, deburring and polishing operations.

Conventionally, a distinction is made between coated abrasives and bonded abrasives.

Coated abrasives comprise a generally flexible support material, spread on the surface of which are abrasive grains set in a binder. The flexible support may be a sheet of paper, a film or a network of fibers, for example a mat, a felt, a woven or a knit of natural or synthetic fibers, especially made from glass or from a polymer. These abrasives may adopt various forms: sheets, strips, disks, etc.

The manufacture of coated abrasives comprises the application of a make coat on the support material, the distribution of the abrasive grains on said coat, heat treatment of the make coat with a view to partially curing it and the application of a size coat which guarantees a firm anchoring of the grains on the support. A supersize coat may be deposited on the size coat and the abrasive grains.

The make, size and supersize coats are applied in liquid form. They are generally composed of a thermosetting resin, especially a phenol-formaldehyde resin of the resol type or a urea-formaldehyde resin.

Bonded abrasives are composed of abrasive grains bound together by a binder which makes it possible to have a three-dimensional structure suitable for carrying out abrasive operations, especially cutting hard materials such as steel. Generally, these abrasives have the appearance of a grinding wheel, a grinding wheel segment and a whetstone.

Bonded abrasives in the form of "conventional" grinding wheels are most frequently formed from a single region composed of abrasive grains embedded in the binder which extends from the bore to the periphery of the grinding wheel. In "superabrasive" grinding wheels, the abrasive region may be located at the periphery, in the form of a strip supported by a central core generally made of metal, and the abrasive grains are composed of a very hard material, for example diamond or cubic boron nitride.

Bonded abrasives are obtained by the process using cold or hot compression molding techniques.

In cold compression molding, the mixture of the abrasive constituents, in granular form, is introduced into a mold, then a sufficient compressive force is applied, of around 15 to 25 $N/mm^2$, to make said mixture into the shape of the mold and to ensure that, after extraction from the mold, the part obtained (green article) has sufficient strength to be able to be handled without losing its initial shape. The part is then heated in an oven at a temperature that allows the binder to be crosslinked, this temperature being dependent, in particular, on the nature of the binder used.

Hot compression molding makes it possible to achieve a higher level of compacting than cold molding, which is expressed by a lower pore volume in the final article. In this process, the granular mixture introduced into the mold is compacted under pressure and simultaneously heated in order to enable the binder to spread out better between the abrasive grains and to occupy the empty spaces. After having been removed from the mold, the part generally undergoes a post-crosslinking heat treatment that aims to improve its operating lifetime and its abrasion performance.

Whatever type of compression molding used, either cold or hot, the mixture of the abrasive constituents is generally used in granular form.

The preparation of the granular mixture is carried out by pretreating the abrasive grains with a liquid impregnation resin, generally a resol-type phenolic resin, then by mixing the wet grains with a resin powder, for example a novolac-type phenolic resin powder, containing a crosslinking agent—powder which will subsequently form the binder itself—and if necessary additives which are generally also in powder form. The mixture obtained is thus composed of abrasive grains, bonded to the surface of which are solid resin and additive particles. This mixture has a good ability to be uniformly distributed in the mold (referred to as "flowability") and to be shaped under the effect of pressure.

The resol-type thermosetting resins used for manufacturing coated abrasives and bonded abrasives have many advantages under the intended usage conditions, especially:

they provide a solid bond between the grains and the support material and between the grains themselves;

they withstand well the high mechanical stresses that occur under the peripheral high-speed grinding conditions, which makes it possible to prevent the tool from breaking;

they have a high thermal resistance which makes it possible to limit the risk of excessive heat build-up within the tool; and they have a sufficient hydrolytic resistance so that the bonded abrasives can be used under grinding conditions which require the presence of water.

Urea-formaldehyde thermosetting resins make it possible to effectively bind the abrasive grains and crosslink at a relatively low temperature which does not generally exceed 100° C.

One drawback of the aforementioned resins, of resol or urea-formaldehyde type, lies in the fact that they contain formaldehyde which can be harmful to the environment.

For several years now, the regulations regarding undesirable emissions have been getting stricter and tend to limit the amount of formaldehyde contained in abrasives or which may be emitted from these products.

Many resin compositions having a low formaldehyde content have been proposed.

Proposed in U.S. Pat. No. 6,133,403 are reactive diluents for phenolic compositions and crosslinkable novolacs intended for producing composite materials that have a high impact strength.

WO 2005/108454 A1 describes a novolac resin and non-formaldehyde hardener composition for reinforcing composites.

Described in U.S. Pat. No. 5,523,152 is a curable composition for abrasives that comprises an aminoplast resin and a reactive diluent which both contain unsaturated pendent groups.

U.S. Pat. No. 5,178,646 describes a binder precursor composition for abrasives, especially coated abrasives, which comprises a thermally crosslinkable resin having a plurality of pendent methylol groups and a reactive diluent having at least one functional group that reacts with the groups of the resin.

The objective of the present invention is to provide a coated or bonded abrasive article, which is obtained from a liquid resin composition which is free from formaldehyde, thus making it possible to have an alternative to the resin compositions based on resols or on urea-formaldehyde resin.

To achieve this objective, the invention proposes to replace the resol or the urea-formaldehyde resin used as an adhesive in coated abrasives and the resol used as an impregnation resin in bonded abrasives with a liquid resin composition which comprises a product that results from the oxidative cleavage of an unsaturated plant or animal oil, chosen from aldehydes, peroxides and mixtures of these compounds.

The product that results from the oxidative cleavage of an unsaturated plant or animal oil may be obtained by a process comprising a step of oxidation of the double bonds of the oil followed by a step of cleavage of the oxidation products to form aldehydes and/or peroxides.

The preparation of such a product is especially described in EP-A-1 198 443.

As examples of the plant oil, mention may be made of wood oil, especially tung oil, sunflower oil, cottonseed oil, palm oil, corn oil, mono-, di- and triglyceride oils such as rapeseed oil, linseed oil, soybean oil, olive oil, castor oil, mustard oil and peanut oil, and phenolic oils such as cashew nut shell liquid. Preferably, the oil chosen is rapeseed oil.

As examples of the animal oil, mention may be made of herring oil, sardine oil, whale oil, tallow, especially beef tallow, and lard.

The oil may be composed of one or more plant or animal oils, and a mixture of these oils.

The first step of oxidation of the oil may be carried out by any oxidizing method that makes it possible to cleave the unsaturated bonds to form aldehydes and/or peroxides, for example by ozonolysis or by using hydrogen peroxide, advantageously combined with a catalyst such as ferrous ions and oxidizing metal salts. Preferably, the oxidation is carried out by ozonolysis.

In the second step, the oxidation products formed are subjected to a cleavage to form aldehydes and/or peroxides, and where appropriate hemiacetals of these aldehydes in the case where the cleavage is carried out in the presence of an alcohol.

The conditions necessary for obtaining the cleavage of the oxidation products are well known to a person skilled in the art; preferably, the cleavage is carried out under reducing conditions, for example by using a metal such as zinc, advantageously combined with an acid such as acetic acid (see EP-A-1 198 443).

According to one preferred embodiment, the product that results from the oxidative cleavage is chosen from aldehydes.

The product that results from the oxidative cleavage of the unsaturated oil represents at least 40% by weight of the liquid resin composition, preferably at least 50%, advantageously at least 60% and better still at least 65%.

The liquid resin composition may moreover comprise a compound that contains at least one hydroxy functional group capable of reacting with the product that results from the oxidative cleavage of the unsaturated oil. For reasons of simplification, this compound is referred to as "hydroxylated compound".

The hydroxylated compound may be chosen from hydroxylated phenolic compounds that may or may not be substituted by at least one saturated or unsaturated $C_1$-$C_{15}$ hydrocarbon-based group, for example phenol, resorcinol, catechol, hydroxyquinone, fluoroglucinol, cardol, cardanol and methylcardol, furanmethanols, for example 2-furanmethanol (or furfurol) and mixtures of these compounds. The natural products, in particular of plant origin, which contain the hydroxylated compound are included within the scope of the present invention.

By way of example, mention may be made of tannins, especially pine, mimosa or quebracho tannin, and cashew nut shell liquid (denoted by CNSL).

The hydroxylated compound may also be chosen from novolacs. Novolacs are known to a person skilled in the art and are obtained by condensation of a phenolic compound and an aldehyde in an aldehyde/phenolic compound molar ratio of less than 1, in the presence of an acid catalyst.

The phenolic compound being incorporated into the novolac composition is chosen from phenol and substituted phenols such as cresols, guaiacol, methoxyphenols, catechol, resorcinol, tert-butylphenol and nonylphenol, bisphenols such as bisphenol A, naphthols and mixtures of these compounds. Preferably, phenol is chosen.

The aldehyde being incorporated into the novolac composition is chosen from alicyclic aldehydes such as formaldehyde, cyclic aldehydes such as furfural, aromatic aldehydes such as benzaldehyde, para-anisaldehyde, ortho-anisaldehyde and veratraldehyde, and mixtures of these aldehydes. Preferably, formaldehyde is chosen.

Preferably, the formaldehyde/phenol molar ratio varies from 0.2 to less than 1, advantageously from 0.35 to 0.9 and better still from 0.5 to 0.9.

The novolac may be prepared by using a known acid catalyst, for example a strong mineral acid such as sulfuric acid, phosphoric acid and hydrochloric acid, or an organic acid such as oxalic acid, salicylic acid or anhydrides such as maleic anhydride. The amount of acid must be sufficient to allow the condensation of the phenolic compound and of the aldehyde. The amount of acid used generally represents from 0.02 to 1% by weight of the starting phenolic compound, preferably 0.1 to 0.6% in the case of a strong mineral acid, and from 0.3 to 3% by weight of the starting phenolic compound in the case of an organic acid.

Preferably, the novolac obtained at the end of the condensation reaction is treated so as to reduce the content of free phenolic compound, for example by vacuum distillation. Advantageously, the novolac has a softening point of less than or equal to 120° C.

Preferably, the hydroxylated compound contains at least two hydroxy functional groups.

The hydroxylated compounds that are particularly preferred are resorcinol, cashew nut shell liquid and novolacs.

The amount of hydroxylated compound present in the liquid resin composition may represent up to 95% by weight of the compound that results from the oxidative cleavage of an unsaturated oil, preferably up to 50% and advantageously up to 45%.

The liquid resin composition may also comprise an acid or basic catalyst which has the role of adjusting the resin crosslinking start temperature.

The acid catalyst may be chosen, in particular, from sulfonic acids, in particular substituted aromatic sulfonic acids such as para-toluenesulfonic acid.

The basic catalyst may be chosen, in particular, from alkali metal hydroxides and alkaline-earth metal hydroxides, preferably sodium hydroxide.

The amount of catalyst introduced into the liquid resin composition may represent up to 10% of the weight of the product from the oxidative cleavage of the unsaturated oil, preferably is at least equal to 0.15%, advantageously varies from 0.3 to 9.5% and better still varies from 0.4 to 9%. By way of indication, the introduction of a quantity of catalyst which varies from 0.4 to 4% makes it possible to obtain a pot life of the liquid resin composition of the order of between 8 and 48 hours.

The liquid resin composition may also comprise an amino compound which has the role of increasing the rate of crosslinking of the resin composition.

The amino compound contains at least one primary or secondary amine functional group. By way of example, mention may be made of urea, ethylene urea, thiourea, melamine, dicyandiamide, carbohydrazide and acetoacetamide. Preferably, urea is chosen.

The amount of amino compound in the resin composition may represent up to 20% of the weight of the product that results from the oxidative cleavage of the unsaturated oil, preferably up to 17% and advantageously up to 15%.

By acting on the amounts of catalyst and of amino compound, it is possible to best adjust the crosslinking conditions and to obtain a good compromise between the temperature at which the resin composition begins to crosslink and the crosslinking rate.

The viscosity of the liquid resin composition depends on the targeted application but remains less than or equal to 7000 mPa·s, measured at 25° C.

According to a first embodiment, the liquid resin composition is used for manufacturing coated abrasives.

In this case, the liquid resin composition comprises the product that results from the oxidative cleavage of an unsaturated oil and the hydroxylated compound which react during the heat treatment to form a crosslinked product.

The amount of hydroxylated compound in the resin composition represents at least 5% by weight of the product that results from the oxidative cleavage of an unsaturated oil, preferably at least 10%, and advantageously at least 15%.

Advantageously, the resin composition contains at least 0.7% by weight of urea relative to the weight of product that results from the oxidative cleavage of an unsaturated oil and of hydroxylated compound, and preferably at least 2%.

Advantageously, the resin composition comprises at least 0.15% by weight of catalyst relative to the weight of product that results from the oxidative cleavage of an unsaturated oil and of hydroxylated compound, preferably at least 0.3%, and advantageously at least 0.4%.

As already indicated, the manufacture of coated abrasives comprises the steps that consist in depositing a make coat on a support material, in spreading the abrasive grains on said coat, subjecting said material to a heat treatment that makes it possible to partially crosslink the resin composition, depositing a size coat and subjecting the coated material to a heat treatment so as to obtain the complete crosslinking of the resin composition. If necessary, a supersize coat may be deposited on the size coat and crosslinked by a suitable heat treatment.

The support material generally has a moderate to high flexibility, and may have the appearance of a sheet, especially of paper, a film, especially a polymer film, or a more or less dense network of natural or synthetic fibers, for example glass fibers and vulcanized fibers.

The abrasive grains may be chosen from known grains, for example composed of alumina, including fused aluminas and sintered aluminas obtained by the sol-gel process, which may or may not be seeded by a material of the same crystalline nature, and which may or may not be chemically modified, of iron oxide, of molybdenum oxide, of vanadium oxide, of alumina-zirconia, of boron-alumina, of silicon carbide, of aluminum oxynitride, of diamond or of cubic boron nitride, and mixtures of such grains. Preferably, the abrasive grains are made of alumina.

The application of the grains onto the make coat may be carried out by the usual techniques that operate by gravity or by an electrostatic route. The density of the abrasive grains on the support is chosen as a function of the desired application.

The liquid resin composition which may be used within the context of the invention may be used to form the make coat, the size coat or the supersize coat.

Preferably, the liquid resin composition is used to form the make coat and the size coat, and where necessary the supersize coat.

Preferably, the liquid resin composition has a viscosity less than or equal to 6000 mPa·s, measured at 25° C.

The liquid resin composition may moreover comprise additives, for example wetting agents, fillers, coupling agents, dyes, pigments and antistatic agents.

When the liquid resin composition is used to form the size coat and/or the supersize coat, it advantageously comprises at least one agent that strengthens the abrasive performance of the final abrasive. Such an agent may be chosen from waxes, halogenated organic compounds, halogen salts, metals and metal alloys.

The heat treatment of the support material coated with the liquid resin composition forming the make coat is generally carried out at a temperature less than or equal to 150° C., preferably less than or equal to 120° C. for 1 to 120 minutes, preferably 1 to 60 minutes.

The heat treatment for crosslinking the resin composition forming the size coat or the supersize coat may be carried out at a temperature less than or equal to 150° C., preferably less than or equal to 120° C. for at most 36 hours, preferably at most 20 hours.

The coated abrasives according to the invention may be, in particular, in the form of sheets, strips or disks.

According to a second embodiment, the liquid resin composition mentioned above is used to manufacture bonded abrasives.

In this embodiment, the liquid resin composition comprises the product that results from the oxidative cleavage of an unsaturated oil and optionally the hydroxylated compound.

The presence of the hydroxylated compound such as described previously for the coated abrasives is not compulsory when the solid resin contains functional groups capable of reacting with the product that results from the oxidative cleavage of an unsaturated oil.

The liquid resin composition is first mixed with abrasive grains in a conventional mechanical mixer until the grains are suitably "wetted", that is to say are coated with the resin composition, then the powdered binder and the additives, also powdered, are added until a homogeneous granular mixture is obtained.

Preferably, the liquid resin composition has a viscosity at most equal to 3000 mPa·s, and advantageously greater than or equal to 600 mPa·s.

The time required to obtain complete crosslinking of the resin composition in the granular mixture is less than or equal to 36 hours, preferably less than or equal to 20 hours, at temperatures which vary between 100 and 200° C.

The abrasive grains may be of any type of abrasive grains already mentioned that are incorporated into the composition of bonded abrasives.

Preferably, the abrasive grains are pretreated with an organic compound that improves the adhesion between the grain and the liquid resin composition, chosen from compounds that contain silicon, for example a silane functionalized by organic groups such as a vinylsilane, especially vinyltriethoxysilane, an aminosilane, especially γ-aminopropyltrimethoxysilane, γ-amino-propyltriethoxysilane and diaminopropylethoxysilane, or an ethoxysilane. Preferably, the γ-aminopropyl-triethoxysilane is used.

The abrasive grains may be treated with the organic compound that contains silicon by, for example, spraying a solution of said compound in a suitable solvent or by dispersing the grains in the aforementioned solution. The treated abrasive grains are dried before being mixed with the liquid resin composition.

If necessary, it is possible to add, to the mixture of abrasive grains and resin composition, an organic liquid medium which helps to wet the grains and to form a uniform grain network, and which is subsequently removed during the crosslinking step. The organic medium may be, in particular, water, an aliphatic alcohol, a glycol, high molecular weight petroleum fractions of oily or waxy consistency, a mineral oil or any other known medium.

The binder may be, for example, a phenol-aldehyde, melamine-aldehyde, urea-aldehyde, polyester, polyimide, epoxy, polyurethane or polybenzimidazole resin. Preferably, the binder is a resin having a low level of formaldehyde, advantageously a phenol-aldehyde resin of novolac type, and better still a phenol-formaldehyde novolac resin.

The additives are, for example, fillers, crosslinking agents and other compounds used for manufacturing bonded abrasives, especially those bonded by an organic resin.

The fillers are generally in the form of a finely divided powder comprising particles which may have the appearance, in particular of granules, spheres or fibers. As examples, mention may be made of sand, silicon carbide, hollow alumina spheres, bauxite, chromites, magnesite, dolomites, hollow mullite spheres, borides, fumed silica, titanium dioxide, carbon-based products (carbon black, coke, graphite, etc.), wood flour, clay, talc, hexagonal boron nitride, molybdenum disulfide, feldspar, naphtheline syenite and glass, in particular in the form of solid, cellular or hollow beads, and fibers. Generally, the fillers represent from 0.1 to 30% by weight of the granular mixture.

Crosslinking agents may be used when the powdered binder is, in particular, a novolac resin. They may be chosen from compounds known for providing the aforementioned function such as hexamethylenetetramine or precursors thereof. The crosslinking agent is added in an amount of at most 20 parts by weight per 100 parts by weight of powdered novolac resin.

The additives may also comprise agents which help in implementing the process, for example antistatic agents and lubricants. The amount of these additives may be easily determined by a person skilled in the art.

Preferably, the granular mixture is subjected to a maturing treatment at ambient temperature for a duration which may range up to 12 hours.

The granular mixture is then introduced into a mold equipped with compression means that make it possible to form a green article which has sufficient cohesion to be able to be handled and treated in the following steps without a substantial change in its shape. At this stage, the binder is in the non-crosslinked state.

The green article is then heated at a sufficient temperature so that the binder can crosslink and give a rigid polymer network that gives the article its final shape. Crosslinking may be carried out according to a conventional curing cycle that consists in bringing the green article to a temperature of around 100° C. and in keeping it at this temperature for 30 minutes to several hours so that the volatile products formed can be discharged. Next, the article is heated at the final temperature for a duration that generally varies from 10 to 36 hours.

The final crosslinking temperature depends, in particular, on the nature of the resin used, on the size and on the shape of the part to be treated and also on the curing duration. In general, the final crosslinking temperature is between 100 and 200° C.

Thermal crosslinking may be carried out in a controlled atmosphere, preferably with a maximum degree of relative humidity.

The bonded abrasives according to the invention may be in the form of grinding wheels, grinding wheel segments, disks and whetstones and of articles of any shape and any size, depending on the intended application.

In particular, the invention relates to the bonded abrasives which are intended to be used in the presence of water, especially for machining metals, in particular steel and aluminum. The crosslinked binder of this type of abrasive has a high hydrolytic resistance in order to retain good mechanical properties when it is used in the presence of water, especially in terms of Young's modulus and maximum tensile strength as explained in the examples.

The examples given below make it possible to illustrate the invention without however limiting it.

In the examples, the properties of the liquid resin compositions and of the coated and bonded abrasives are measured under the following conditions:

Resin Compositions

The crosslinking start temperature ($T_c$) is measured by dynamic mechanical analysis (DMA): the liquid resin composition is introduced between two glass plates and the assembly is positioned horizontally in a device comprising two lower jaws fixed at a distance of 40 mm apart and an upper jaw applied against the upper sheet located at 20 mm from each of the preceding jaws. A force of 80 mPa is applied to the upper jaw with an oscillation frequency of 1 Hz, while heating the assembly from 25 to 300° C. at a rate of 4° C./minute. The elastic modulus of the resin composition is measured as a function of the temperature and the crosslinking start temperature is determined from the curve established.

Coated Abrasives

The adhesion of the grains to the resin composition is evaluated by passing a finger over the surface of the resin. (+) is noted when the grains adhere to the resin and (−) is noted when they come away from it.

The tack is estimated by pressing a finger on the resin layer. (+) is noted when the resin sticks to the finger when it is removed and (−) is noted when the resin does not stick.

The tear strength of the abrasive grains (peeling) is measured as follows: deposited on a cotton or polyester support (15 cm×2.5 cm) is a liquid resin layer having a thickness of 150 μm, then the abrasive grains are sprinkled. The support is introduced into an oven and heated according to the following temperature cycle:

70° C. for 35 minutes;
80° C. for 50 minutes;
90° C. for 50 minutes;
100° C. for 42 minutes; and
115° C. for 42 minutes.

Two supports are positioned opposite one another (the surfaces coated with the resin and the grains being arranged face-to-face), they are assembled and the adhesion of the resin to the support is measured by means of a tensile rig operating at a speed of 25 mm/min.

Bonded Abrasives

The flexural strength and the Young's modulus of the test specimens are measured under the conditions of the ASTM D790-91 standard using a three-point bending test with a 50.8 mm gap and crosshead speed of 2.54 mm/minute. For each test specimen, the average flexural strength and the average Young's modulus established over 6 measurement points and the standard deviation (s.d) are given.

EXAMPLES 1 TO 29

Manufacture of Coated Abrasives.

Resin compositions having the composition given in Table 1 (in parts by weight) were prepared by mixing RSO aldehydes and resorcinol, then by adding the catalyst and urea.

Liquid resin compositions, the composition of which is given in Table 2 (in parts by weight) were also prepared by mixing the RSO aldehydes with cashew nut shell liquid (CNSL) or a novolac, possibly furfurol, then by adding the catalyst and urea.

RSO (rapeseed oil) aldehydes are aldehydes of triglycerides obtained by ozonolysis of rapeseed oil under the conditions from Example 1 of Patent EP 1 198 443 A1.

The novolacs are sold under the reference Bakelite® PF5885 (softening point: 50-60° C.) and Bakelite® PF8505 (softening point of the order of 40° C.) by Hexion Specialty Chemicals.

The crosslinking start temperature and the pot life were measured for the liquid resin compositions (Tables 1 and 2).

The liquid resin compositions from Examples 1 to 8, 11 and 13 to 29 and also a conventional resin composition, denoted by Reference 1 (sold under the reference Bakelite® PF0361SW01 by Hexion Specialty Chemicals) were applied separately to glass slides using a film applicator so as to form a layer having a thickness of 200 µm.

Deposited onto this layer, which acted as the make coat, were abrasive grains made of alumina (sold under the reference ALUMINA 57A GRIT 60 or GRIT 16 by Saint-Gobain Ceramics and Plastics) and the excess grains that had not adhered to the layer were removed.

The glass slides were heated according to the following temperature cycle:
  85° C. for 15 minutes;
  95° C. for 15 minutes; and
  110° C. for 15 minutes.

The tack and the adhesion of the grains to the resin composition were measured for the cooled slides (Tables 1 and 2).

The liquid resin compositions from Examples 1 to 15 have a crosslinking start temperature at most equal to 160° C. (Example 7). The crosslinking start temperature may be decreased by adding urea to the resin compositions (Examples 6 and 7; Examples 8 to 10).

The liquid resin compositions from Examples 1 to 29 have acceptable pot life and tear strength.

EXAMPLES 30 AND 31

Manufacture of Bonded Abrasives.

Granular mixtures having the composition given in Table 3 below were prepared:

TABLE 3

|  | Ex. 30 | Ex. 31 | Ref. 2 |
|---|---|---|---|
| Abrasive grains | 452.74 g | 452.74 g | 452.74 g |
| Liquid resin composition |  |  |  |
| Aldehydes of (RSO) triglycerides | 9.93 g | 6.23 g | — |
| Resorcinol | — | 1.83 g | — |
| Urea | — | 0.20 g | — |
| NaOH | — | 0.04 g | — |
| Water | — | 1.63 g | — |
| Resol | — | — | 7.34 g |
| Solid resin | 33.26 g | 33.26 g | 35.85 g |

The abrasive grains were grains of alumina (sold under the reference ALUMINA 57A GRIT 60 by Saint-Gobain Ceramics and Plastics) treated under the following conditions:

453 g of abrasive grains were mixed with 7 g of a 2 wt % aqueous solution of an aminosilane (sold under the reference SILQUEST A1102 by GE Silicones) for a sufficient time to obtain uniform "wetting" of the grains, then the mixture was dried at 145° C. for 2 hours.

The RSO aldehydes were aldehydes of triglycerides obtained by ozonolysis of rapeseed oil under the conditions from Example 1 of the Patent EP 1 198 443 A1.

The resol was a phenol-formaldehyde resol (sold under the reference BAKELITE® 0433SW07 by Hexion Specialty Chemicals).

The solid resin was a novolac resin which contained 6.5% by weight of hexamine (sold under the reference Bakelite® PF8686 by Hexion Specialty Chemicals).

The abrasive grains were mixed with the liquid resin composition until the grains were "wetted" uniformly, then the solid resin was added and the mixing conditions were maintained for a sufficient time to obtain a homogeneous granular mixture. The mixture underwent a maturing step for 6 hours, then it was screened (10-18 mesh).

The test specimens were obtained by cold compression molding of 75.64 g of the granular mixture obtained under b) in a mold with dimensions of 10.224 cm×2.591 cm×1.27 cm. The green test specimens were removed from the mold, hermetically sealed in aluminum foil and hardened in an oven according to the following temperature cycle:
  25 to 60° C. in 10 minutes;
  60 to 100° C. in 40 minutes;
  hold at 100° C. for 80 minutes;
  100 to 160° C. in 180 minutes; and
  hold at 160° C. for 10 hours.

The test specimens had a pore volume equal to 33%, a grain volume equal to 52% and a volume of binder (liquid resin composition+solid resin) equal to 15%.

These test specimens were separated into two series: the first series did not undergo any treatment, the second series was immersed in boiling water for 150 minutes to simulate the conditions of an accelerated ageing.

Table 4 collates the measurements of the flexural strength and of the Young's modulus of the test specimens and also the ratios:
R1=flexural strength after treatment/flexural strength without treatment; and
R2=Young's modulus after treatment/Young's modulus without treatment.

The test specimens produced with the liquid resin composition according to the invention have R1 and R2 ratios greater than those of the test specimen from Reference 2, which denotes a better hydrolytic resistance.

TABLE 1

| Example | 1 | 2 | 3 | 4 | 5 | 6 | 7 | 8 | 9 | 10 | 11 | 12 | 13 | 14 | 15 | Ref. 1 |
|---|---|---|---|---|---|---|---|---|---|---|---|---|---|---|---|---|
| Aldehydes of RSO triglycerides | 100 | 100 | 100 | 100 | 100 | 100 | 100 | 100 | 100 | 100 | 100 | 100 | 100 | 100 | 100 | — |
| Resorcinol | 20 | 30 | 30 | 30 | 30 | 30 | 30 | 30 | 30 | 30 | 30 | 30 | 30 | 30 | 40 | — |
| NaOH | 0.6 | 1.0 | 0.8 | 0.6 | 0.6 | 0.6 | 0.6 | 0.5 | 0.5 | 0.5 | 0.4 | 0.4 | 0.2 | 0 | 0.6 | — |
| Urea | 3 | 3 | 3 | 3 | 5 | 1 | 0 | 3 | 1 | 0 | 3 | 1 | 3 | 3 | 3 | — |
| Water | 27.5 | 40.8 | 34.2 | 27.5 | 32.5 | 22.5 | 20.0 | 24.2 | 19.2 | 16.7 | 20.8 | 15.8 | 14.2 | 7.5 | 27.5 | — |
| $T_C$ (° C.) | n.d. | n.d. | n.d. | 110 | n.d. | 100 | 160 | 120 | 120 | 150 | 120 | 115 | n.d. | n.d. | n.d. | 115 |
| Pot life (hours) | 48 | 12 | 12 | 48 | 12 | 24 | 24 | 12 | n.d. | n.d. | 12 | n.d. | 12 | 12 | 48 | >8 |
| Tack | − | − | − | − | − | − | − | − | n.d. | n.d. | − | n.d. | − | − | − | + |
| Adhesion of the grains | | | | | | | | | | | | | | | | |
| ALUMINA GRIT 60 | + | + | + | + | + | + | − | + | n.d. | n.d. | + | n.d. | + | + | + | + |
| ALUMINA GRIT 16 | + | + | + | + | + | + | + | + | n.d. | n.d. | + | n.d. | + | + | + | + |
| Tear strength (N) | n.d. | n.d. | n.d. | 77 | n.d. | n.d. | n.d. | n.d. | n.d. | n.d. | n.d. | n.d. | n.d. | n.d. | 83 | 100 | n.d.: not determined

TABLE 2

| Example | 16 | 17 | 18 | 19 | 20 | 21 | 22 | 23 | 24 | 25 | 26 | 27 | 28 | 29 | Ref. 1 |
|---|---|---|---|---|---|---|---|---|---|---|---|---|---|---|---|
| Aldehydes of RSO triglycerides | 100 | 100 | 100 | 100 | 100 | 100 | 100 | 100 | 100 | 100 | 100 | 100 | 100 | 100 | — |
| CNSL | 85 | 85 | 0 | 0 | 0 | 0 | 0 | 0 | 0 | 0 | 0 | 0 | 0 | 0 | — |
| Bakelite ® PF5885 | 0 | 0 | 30 | 0 | 0 | 30 | 0 | 0 | 30 | 0 | 0 | 30 | 0 | 0 | — |
| Bakelite ® PF8505 | 0 | 0 | 0 | 30 | 21 | 0 | 30 | 21 | 0 | 30 | 21 | 0 | 30 | 21 | — |
| Furfurol | 0 | 0 | 0 | 0 | 9 | 0 | 0 | 9 | 0 | 0 | 9 | 0 | 0 | 9 | — |
| NaOH | 4 | 4 | 4 | 4 | 4 | 4 | 4 | 4 | 2 | 2 | 2 | 2 | 2 | 2 | — |
| Urea | 2 | 4 | 2 | 2 | 2 | 6 | 6 | 6 | 6 | 6 | 6 | 2 | 2 | 2 | — |
| Water | 44 | 47 | 31 | 31 | 31 | 36 | 36 | 36 | 24 | 24 | 24 | 19 | 19 | 19 | — |
| $T_R$ (° C.) | n.d. | n.d. | n.d. | n.d. | n.d. | n.d. | n.d. | n.d. | n.d. | n.d. | n.d. | n.d. | n.d. | n.d. | 115 |
| Pot life (hours) | 24 | 24 | 18 | 18 | 18 | 8 | 8 | 8 | 12 | 12 | 12 | 18 | 18 | 18 | >8 |
| Tack | + | − | − | − | − | − | − | − | − | − | − | − | − | − | + |
| Adhesion of the grains | | | | | | | | | | | | | | | |
| ALUMINA GRIT 60 | + | + | + | + | + | + | + | + | + | + | + | + | + | + | + |
| ALUMINA GRIT 16 | − | − | + | + | + | + | + | + | + | + | + | +/− | +/− | +/− | + |
| Tear strength (N) | n.d. | n.d. | n.d. | n.d. | n.d. | n.d. | n.d. | n.d. | n.d. | n.d. | n.d. | n.d. | n.d. | n.d. | 100 | n.d.: not determined

TABLE 4

| | Without treatment | | | | After treatment | | | | | |
|---|---|---|---|---|---|---|---|---|---|---|
| Ex. | Flexural strength (MPa) | s.d. | Young's modulus (MPa) | s.d. | Flexural strength (MPa) | s.d. | Young's modulus (MPa) | s.d. | R1 (%) | R2 (%) |
| 30 | 40.0 | 2.2 | 4150 | 186 | 31.7 | 0.7 | 3428 | 95 | 69.3 | 68.3 |
| 31 | 31.9 | 1.0 | 4175 | 68 | 23.6 | 1.0 | 2732 | 87 | 73.6 | 75.1 |
| Ref. 2 | 47.3 | 1.7 | 4278 | 108 | 21.7 | 0.8 | 3133 | 82 | 45.9 | 73.2 |

The invention claimed is:

1. An abrasive article, comprising at least one grain of an abrasive bound by a binder comprising a liquid resin composition which comprises:
   (i) a product that results from an oxidative cleavage of an unsaturated, plant or animal oil, which is at least one selected from the group consisting of an aldehyde and a peroxide, wherein the aldehyde is not formaldehyde.
2. The abrasive article of claim 1, wherein the product (i) is at least one aldehyde.
3. The abrasive article of claim 1, wherein the unsaturated plant oil is present and is selected from the group consisting of wood oil, sunflower oil, cottonseed oil, palm oil, corn oil, a monogylceride oil, a diglyceride oil, a triglyceride oil, and a phenolic oil.
4. The abrasive article of claim 1, wherein the unsaturated animal oil is present and is selected from the group consisting of herring oil, sardine oil, whale oil, tallow, and lard.
5. The abrasive article of claim 1, wherein the product (i) represents at least 40% by weight of the liquid resin composition.
6. The abrasive article of claim 1, wherein the liquid resin composition further comprises:
   (ii) a compound comprising at least one hydroxy functional group capable of reacting with the product (i).
7. The abrasive article of claim 6, wherein the compound (ii) is selected from the group consisting of a hydroxylated phenolic compound, optionally substituted by at least one saturated or unsaturated $C_1$-$C_{15}$ hydrocarbon-comprising group, and a furanmethanol.

8. The abrasive article of claim 6, wherein the compound (ii) is at least one novolac.

9. The abrasive article of claim 8, wherein the at least one novolac has a softening point of less than or equal to 120° C.

10. The abrasive article of claim 6, wherein the compound (ii) comprises at least two hydroxy functional groups.

11. The abrasive article of claim 10, wherein the compound is resorcinol, cashew nut shell liquid, or a novolac.

12. The abrasive article of claim 6, wherein an amount of the compound (ii) represents up to 95% by weight of the product (i).

13. The abrasive article of claim 6, wherein the liquid resin composition further comprises:
   (iii) an acid or basic catalyst.

14. The abrasive article of claim 13, wherein, when present, the acid catalyst (iii) is at least one substituted aromatic sulfonic acid and
   the basic catalyst, when present, is selected from the group consisting of an alkali metal hydroxide and an alkaline-earth metal hydroxide.

15. The abrasive article of claim 14, wherein an amount of catalyst (iii) represents up to 10% by weight of the product (i).

16. The abrasive article of claim 1, further comprising:
   an amino compound comprising at least one primary or secondary amine functional group.

17. The abrasive article of claim 16, wherein the amino compound is selected from the group consisting of urea, ethylene urea, thiourea, melamine, dicyandiamide, carbohydrazide, and acetoacetamide.

18. The abrasive article of claim 16, wherein the amino compound represents up to 20% of the weight of the product (i).

19. The abrasive article of claim 1, wherein the liquid resin composition comprises a compound (ii) comprising at least one hydroxy functional group in an amount that represents at least 5% by weight of the product (i).

20. The abrasive article of claim 1, in the form of a bonded abrasive.

21. The abrasive article of claim 19, wherein the at least one grain of the abrasive is a coated abrasive.

22. A method of manufacturing an abrasive article according to claim 1, wherein the method comprises: contacting a precursor to the abrasive article with a liquid resin composition which comprises a product that results from the oxidative cleavage of an unsaturated, plant or animal oil, which is at least one selected from the group consisting of an aldehyde, and a peroxide.

23. The abrasive article of claim 1, wherein the product (i) represents at least 50% by weight of the liquid resin composition.

24. The abrasive article of claim 1, wherein the product (i) represents at least 60% by weight of the liquid resin composition.

* * * * *